Patented June 23, 1936

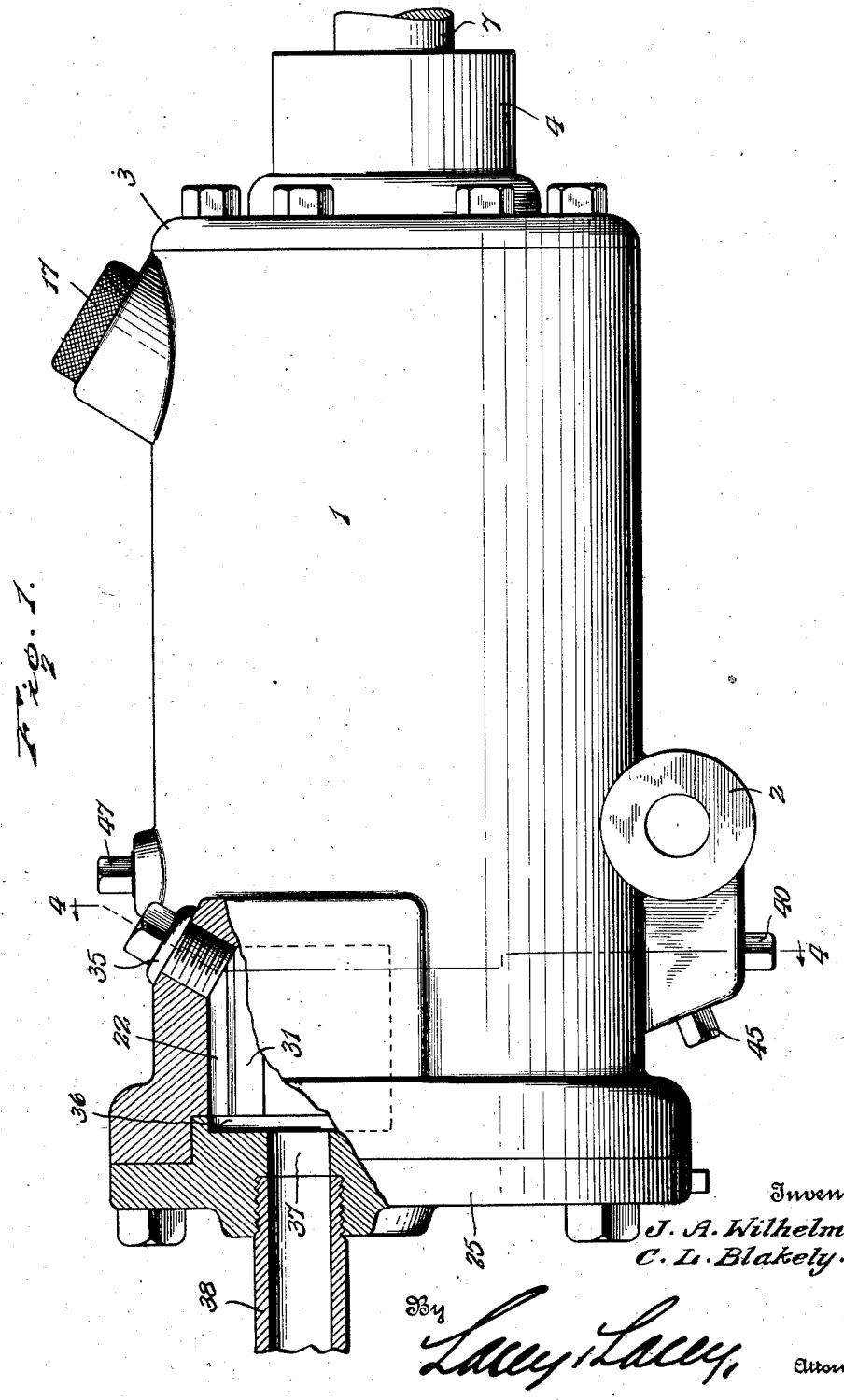

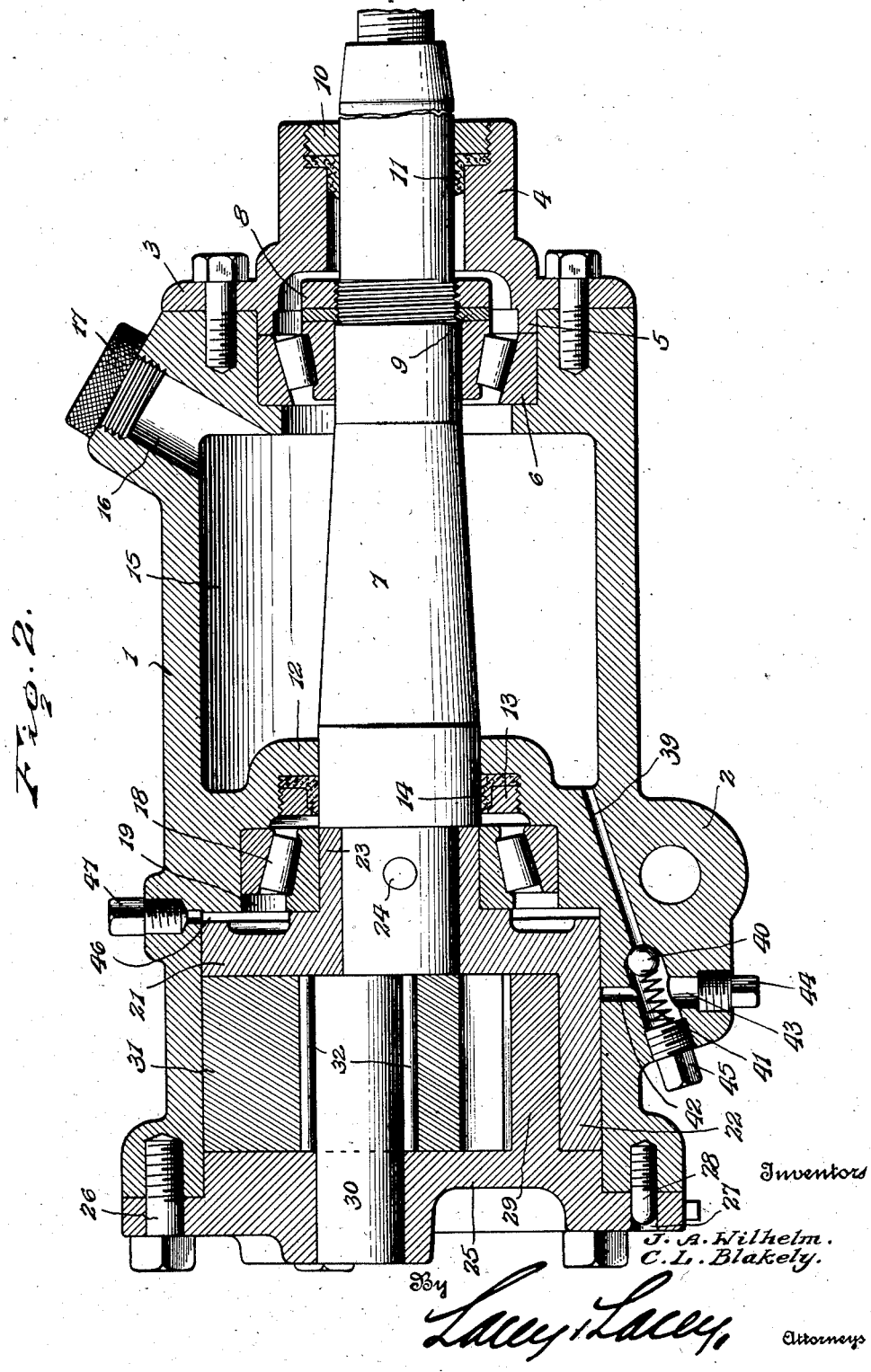

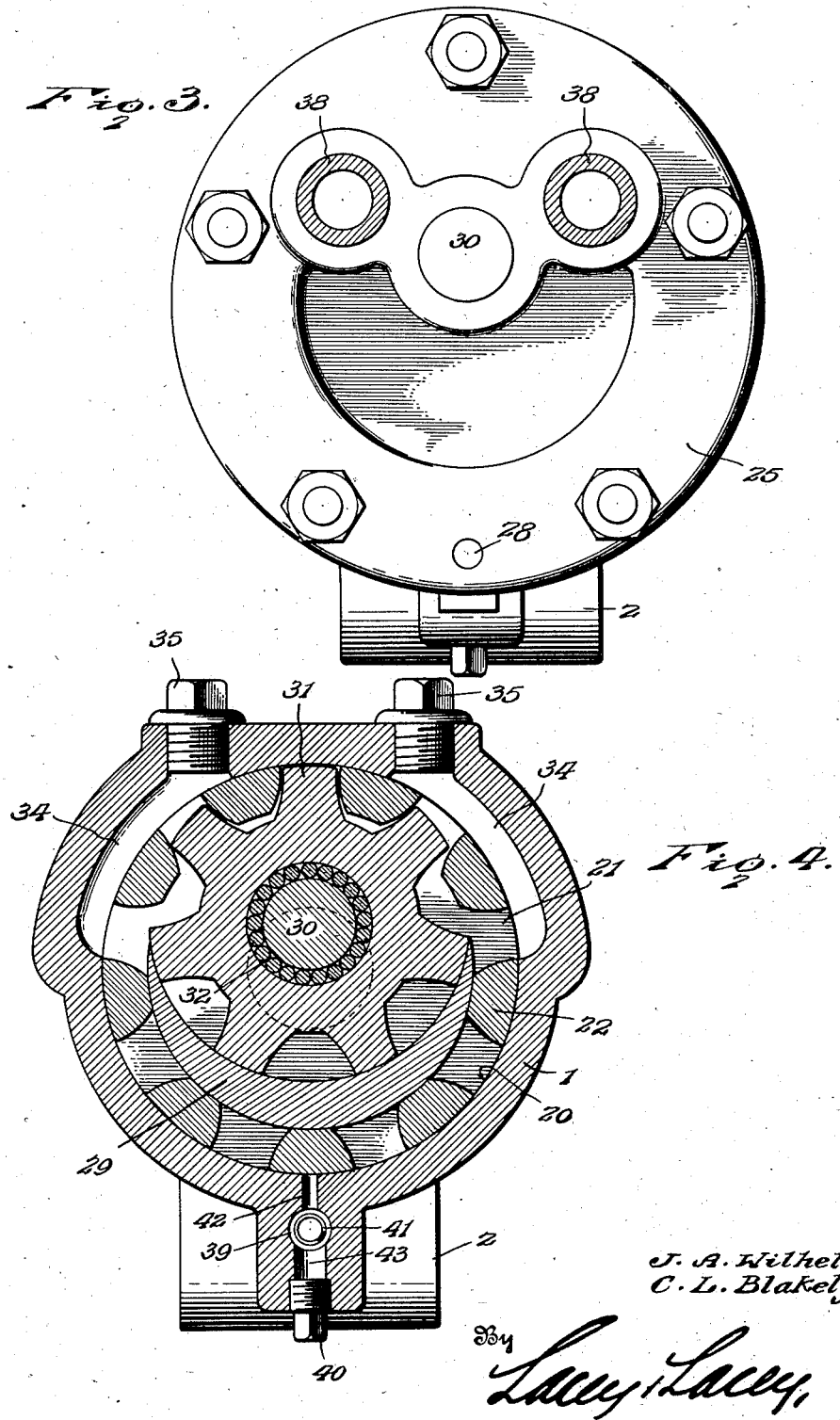

2,044,893

UNITED STATES PATENT OFFICE 2,044,893

STEERING GEAR

John A. Wilhelm, North Bend, and Carl L. Blakely, Snoqualmie Falls, Wash.

Application September 17, 1934, Serial No. 744,418

1 Claim. (Cl. 103—126)

This invention relates to steering gear, and has special reference to hydraulically controlled steering gear for automobiles, although it is applicable to motor boats and may be used in various other appliances. The invention seeks particularly to provide a structure in which the operating shaft will be supported in such a manner that it may be rotated easily and will not be apt to sway in its bearings so as to be distorted, and it is also an object to provide means for automatically overcoming possible leakage in the operating portion of the system. The invention is illustrated in the accompanying drawings and consists in certain novel features which will be hereinafter first fully described and then more particularly defined in the appended claims.

In the drawings:

Figure 1 is a side elevation, partly broken away and in section, of so much of a steering mechanism as will suffice for an understanding of the invention.

Figure 2 is a longitudinal section of the same.

Figure 3 is an end view.

Figure 4 is a section on the line 4—4 of Figure 1.

In carrying out the present invention, there is provided a substantially cylindrical body or casing 1 which is formed between its ends with a perforated lug 2 whereby it is adapted to be pivotally supported upon the frame of an automobile or other fixed support. One end of this casing is closed by a head 3 which is bolted or otherwise secured to the end of the casing and is constructed with a boss 4 to which a master shaft or sheathing may be secured if desired. The head is formed with an internal flange 5 fitting closely within the end of the casing and bearing against a roller bearing 6 seated in the end of the casing so as to retain said bearing in place. The controlling or operating shaft 7 passes through the casing 1 and is rotatable in the bearing 6, a lock nut 8 being mounted upon the shaft and holding a washer 9 to the bearing so that the leakage of oil past the bearing will be minimized and the bearing will be properly lubricated. The boss 4 has a bore somewhat greater in diameter than the controlling shaft and a lock nut 10 is fitted in the end of the boss against a packing 11 so that oil which may pass the bearing will be retained around the shaft. The shaft may be extended to any desired point and ordinarily will pass up through the steering column of the vehicle to be equipped with the usual steering wheel. The casing is formed approximately midway its ends with a partition 12 through which the shaft 7 passes and a lock nut 13 is fitted in the outer side of this partition to maintain a packing 14 in close engagement with the shaft to prevent leakage of oil. The interior of the casing between the partition and the head 3 constitutes a reserve chamber 15 which is filled with oil to provide a reserve supply which will automatically compensate for leakage in the system. A filling opening 16 is provided upon the top of the casing to lead into this reserve supply chamber and the opening is normally closed by a plug 17, as will be understood. At the outer side of the lock nut 13 and adjacent the same, roller bearings 18 are seated in an annular recess 19 formed in the casing, as shown.

Beyond the annular recess 19, the casing is expanded to form a circular chamber 20 in which is mounted a gear consisting of a disc 21 and teeth 22 formed on the outer face of the disk at the margin thereof, the disc being provided with a hub 23 on its rear side which receives the end 20 of the shaft 7 and is secured thereto in any approved manner as by a pin 24. The end of the chamber 20 is closed by a head 25 which fits in the end of the casing and is secured thereto by cap screws or bolts 26, the head being provided adjacent its lower side with an opening 27 to engage over a guide pin 28 secured in and projecting from the end of the casing so that the head will be always placed in the proper operative position. On its inner face, the head is formed with an integral crescent shaped partition 29 which is so located that it defines a channel or passageway with the wall of the casing through which the teeth 22 will pass as the gear is rotated. Carried by the head 25 and eccentric to the operating shaft is a stub shaft 30 and rotatably mounted upon this stub shaft is an idler gear 31, the teeth of which mesh with the teeth 22 of the driving gear in the upper portion of said driving gear, as clearly shown in Figure 4. To reduce the frictional resistance and wear as much as possible, a series of needle rollers 32 are interposed between the idler and the stub shaft, as clearly shown in Figures 2 and 4. In the sides of the main casing adjacent the top of the same, recesses 34 are formed at the sides of the gears, and in the top of the casing filling openings lead into said recesses, said openings being normally closed by plugs 35. Recesses 36 are formed in the head 25 to register with the recesses 34, and ports 37 in the head direct the fluid from the recesses into circulating pipes 38, this arrangement providing for a free circulation or flow of fluid from the ends of the recesses when the device is in operation.

In the under side of the main casing is formed a passage 39 which leads from the reserve supply chamber 15 and houses a ball check valve 40 which is normally held seated in the enlarged outer end of the passage by a spring 41, as clearly shown in Figure 2. A branch passage or port 42 beyond the check valve establishes communication with the chamber 20 of the casing and alined with said port is a drain port 43 which leads through the bottom of the casing, said drain port being normally closed by a plug 44. A plug 45 closes the outer end of the passage 39 and forms also a means for adjusting the tension of the spring 41.

A vent port 46 is formed through the top of the casing at the rear of the gear 21 so that air may be permitted to escape when the system is being filled, and a plug 47 is provided to normally close said vent passage or port.

It is to be understood that when the invention is applied to the steering gear of an automobile, for instance, the pipes 38 will lead to an approved instrumentality connected with the radius rod of the automobile steering gear so that if the flow through these pipes be in one direction the steering gear will be shifted to lead the vehicle to one side and if the flow be in the opposite direction the vehicle will be led to the opposite side. The instrumentality may be a cylinder supported in a fixed position, as upon the front axle of the vehicle, and containing a piston which is connected to the radius rod, the pipes 38 being connected with the opposite ends of the cylinder. The entire system is filled with oil through the filling openings at the tops of the recesses 34 and some of the oil or other fluid will find its way through the port 42 to the outer side of the check valve 40 but will be unable to pass the check valve. The reserve chamber 15 is also filled with the oil or other non-compressible fluid through the filling opening 16. The gears 21 and 31 constitute a gear pump so that if the shaft 7 be turned in either direction the gear 21 will turn therewith and will transmit movement to the idler so that the fluid between the teeth will be caused to flow from one recess 34 or one side of the system to the opposite recess or side of the system. Should leakage occur so that the pressure in the system will be lowered, the partial vacuum thereby produced in the system will cooperate with the weight of the oil in the reserve chamber 15 to open the check valve 40 whereupon sufficient oil will flow through the passage 39 and port 42 to replenish the supply in the working system, and when the supply has been replenished the pressure upon the check valve will be balanced and the spring 41 will then again seat the valve so as to prevent further flow from the reserve chamber.

It is to be particularly noted that the operating shaft is mounted in roller bearings at opposite ends of the reserve chamber so that the bearings will be spaced apart to such an extent as to properly support the shaft and provide for its easy turning movement while resisting any tendency of the shaft to become distorted. The structure is simple and may be readily mounted upon any relatively fixed support so as to be easily manipulated to set a driven part in a desired position.

Having thus described the invention, we claim:

An apparatus of the type described comprising a casing having a reserve chamber therein and a working chamber at one end, a pump mounted in the working chamber, means for operating the pump, a straight passage being provided extending from the inner end of the reserve chamber at an incline outwardly through the wall of the casing and beyond the inner end of the working chamber, the outer portion of said passage being increased in diameter to provide a valve chamber, a port leading transversely from said valve chamber and connecting the valve chamber with the working chamber, a check valve in the valve chamber between the port and inner end of the valve chamber, a plug threaded into the outer end of said valve chamber, a spring in the valve chamber between the plug and the valve and tensioned by the plug to yieldably resist movement of the valve in a direction to prevent flow from the reserve chamber, a drain opening leading from the valve chamber in alinement with the port, and a removable plug for closing the outlet end of the drain opening.

JOHN A. WILHELM. [L. S.]
CARL L. BLAKELY. [L. S.]